US012755172B2

(12) United States Patent
Ezrielev et al.

(10) Patent No.: US 12,755,172 B2
(45) Date of Patent: Oct. 6, 2026

(54) ENSURING COMPLIANCE OF DATA FOR USE IN A DATA PIPELINE WITH LIMITATIONS ON DATA COLLECTION

(71) Applicant: Dell Products L.P., Round Rock, TX (US)

(72) Inventors: Ofir Ezrielev, Beer Sheva (IL); Hanna Yehuda, Acton, MA (US); Inga Sogaard, Wichita, KS (US)

(73) Assignee: Dell Products L.P., Round Rock, TX (US)

( * ) Notice: Subject to any disclaimer, the term of this patent is extended or adjusted under 35 U.S.C. 154(b) by 565 days.

(21) Appl. No.: 18/343,950

(22) Filed: Jun. 29, 2023

(65) Prior Publication Data

US 2025/0005393 A1 Jan. 2, 2025

(51) Int. Cl.
*G06N 5/04* (2023.01)

(52) U.S. Cl.
CPC .................................... *G06N 5/04* (2013.01)

(58) Field of Classification Search
None
See application file for complete search history.

(56) References Cited

U.S. PATENT DOCUMENTS 7,315,805 B2 1/2008 Slater
7,788,470 B1 8/2010 Purcell
9,990,383 B2 6/2018 Brinnand
10,168,691 B2 1/2019 Zornio et al.
10,339,470 B1 * 7/2019 Dutta .................... G06N 20/20
10,936,479 B2 3/2021 Maag et al.
11,101,037 B2 8/2021 Allen
11,221,270 B2 1/2022 Evans
11,281,453 B1 3/2022 Ramachandran
11,314,517 B2 4/2022 Keski-Valkama
11,341,605 B1 5/2022 Singh
11,853,853 B1 12/2023 Beauchesne et al.
12,008,046 B1 6/2024 Curtis et al.
12,019,902 B2 6/2024 Haile
(Continued)

OTHER PUBLICATIONS

Wang, Haozhe, et al., "A graph neural network-based digital twin for network slicing management," IEEE Transactions on Industrial Informatics 18.2 (2020): 1367-1376 (11 Pages).
(Continued)

*Primary Examiner* — Kaveh Abrishamkar
(74) *Attorney, Agent, or Firm* — WOMBLE BOND DICKINSON (US) LLP

(57) ABSTRACT

Methods and systems for managing operation of a data pipeline are disclosed. Managing the operation of the data pipeline when a portion of data is inaccessible may require generating a synthetic portion of data to generalize the inaccessible portion of data. To do so, it may be determined whether the type of information associated with the inaccessible portion of the data may be reliably predicted within a reliability range using an inference model and the available portion of the data. The reliability range may include a minimum level of accuracy and a maximum level of accuracy for imputed data. If the inaccessible portion of the data may be reliably predicted, the inference model may utilize the available portion of the data to predict the inaccessible portion of the data to obtain supplemented data. The supplemented data may then be used in the data pipeline.

20 Claims, 10 Drawing Sheets

(56) References Cited

U.S. PATENT DOCUMENTS

| | | | | |
|---|---|---|---|---|
| 12,182,098 | B1 | 12/2024 | Ezrielev | |
| 12,216,651 | B2 | 2/2025 | Krishnan | |
| 12,242,447 | B2 | 3/2025 | Ezrielev | |
| 12,242,543 | B1 | 3/2025 | Pai | |
| 12,242,892 | B1 | 3/2025 | Burnett | |
| 2004/0064750 | A1 | 4/2004 | Conway | |
| 2006/0009881 | A1 | 1/2006 | Ferber et al. | |
| 2013/0205285 | A1 | 8/2013 | Pizlo | |
| 2013/0226838 | A1* | 8/2013 | Chu | G06N 20/00 706/12 |
| 2013/0227573 | A1 | 8/2013 | Morsi | |
| 2014/0037161 | A1 | 2/2014 | Rucker | |
| 2014/0136184 | A1 | 5/2014 | Hatsek | |
| 2016/0098037 | A1 | 4/2016 | Zornio | |
| 2016/0179063 | A1 | 6/2016 | De Baynast De Septfontaines | |
| 2017/0255460 | A1 | 9/2017 | Frank | |
| 2017/0262298 | A1 | 9/2017 | Frank | |
| 2018/0046926 | A1* | 2/2018 | Achin | G06N 5/02 |
| 2018/0052708 | A1 | 2/2018 | Ganesan | |
| 2018/0081871 | A1 | 3/2018 | Williams | |
| 2018/0137431 | A1* | 5/2018 | Goldfarb | G06N 20/00 |
| 2019/0034430 | A1 | 1/2019 | Das | |
| 2019/0236204 | A1 | 8/2019 | Canim | |
| 2019/0251479 | A1 | 8/2019 | Anderson et al. | |
| 2019/0361697 | A1 | 11/2019 | Hu | |
| 2019/0370263 | A1 | 12/2019 | Nucci | |
| 2020/0166558 | A1 | 5/2020 | Weis | |
| 2020/0167224 | A1 | 5/2020 | Abali | |
| 2020/0202478 | A1 | 6/2020 | Thumpudi et al. | |
| 2020/0293684 | A1 | 9/2020 | Harris | |
| 2020/0344325 | A1 | 10/2020 | Sarisky | |
| 2020/0356428 | A1 | 11/2020 | Rama | |
| 2020/0387836 | A1* | 12/2020 | Nasr-Azadani | G06N 20/20 |
| 2020/0394044 | A1 | 12/2020 | Keski-Valkama | |
| 2021/0027771 | A1 | 1/2021 | Hall | |
| 2021/0081836 | A1 | 3/2021 | Polleri | |
| 2021/0098133 | A1* | 4/2021 | Chowdhry | G16H 50/70 |
| 2021/0116505 | A1 | 4/2021 | Shu | |
| 2021/0117548 | A1 | 4/2021 | Gokhman | |
| 2021/0117859 | A1 | 4/2021 | Rogers | |
| 2021/0248165 | A1 | 8/2021 | Fry | |
| 2021/0374143 | A1 | 12/2021 | Neill | |
| 2021/0377286 | A1 | 12/2021 | Shukla et al. | |
| 2021/0385196 | A1 | 12/2021 | Rahmat | |
| 2021/0406110 | A1 | 12/2021 | Vaid et al. | |
| 2022/0014584 | A1 | 1/2022 | Huetter | |
| 2022/0086175 | A1 | 3/2022 | Bharrat | |
| 2022/0092234 | A1 | 3/2022 | Karri | |
| 2022/0215142 | A1* | 7/2022 | Gutierrez | G06N 3/006 |
| 2022/0215243 | A1* | 7/2022 | Narayanaswami | G06F 18/2193 |
| 2022/0301027 | A1 | 9/2022 | Basta | |
| 2022/0309411 | A1 | 9/2022 | Ramaswamy | |
| 2022/0310276 | A1 | 9/2022 | Wilkinson | |
| 2022/0374399 | A1 | 11/2022 | Kementsietsidis | |
| 2023/0014438 | A1 | 1/2023 | Jones | |
| 2023/0040284 | A1* | 2/2023 | Ali-Tolppa | H04L 63/126 |
| 2023/0040834 | A1 | 2/2023 | Haile | |
| 2023/0081880 | A1 | 3/2023 | Mathur | |
| 2023/0090398 | A1 | 3/2023 | Upadhyay | |
| 2023/0126260 | A1 | 4/2023 | Elsakhawy et al. | |
| 2023/0153095 | A1 | 5/2023 | Rahill-Marier | |
| 2023/0196096 | A1 | 6/2023 | Milne | |
| 2023/0213930 | A1 | 7/2023 | Rakshit | |
| 2023/0293907 | A1* | 9/2023 | Shade | A61N 5/1031 600/1 |
| 2023/0315078 | A1 | 10/2023 | Sepulveda et al. | |
| 2023/0342281 | A1 | 10/2023 | Haile | |
| 2023/0418280 | A1 | 12/2023 | Emery | |
| 2024/0095576 | A1* | 3/2024 | Pinho | G06N 3/098 |
| 2024/0119364 | A1 | 4/2024 | Jain | |
| 2024/0126888 | A1 | 4/2024 | Kalou et al. | |
| 2024/0235952 | A9 | 7/2024 | Hicks | |
| 2024/0281419 | A1 | 8/2024 | Alfaras | |
| 2024/0281522 | A1 | 8/2024 | Kuo | |
| 2024/0320252 | A1* | 9/2024 | U | G06N 20/00 |
| 2024/0330136 | A1 | 10/2024 | Furlong | |
| 2024/0370749 | A1* | 11/2024 | Binkley | G06N 20/00 |
| 2024/0412104 | A1 | 12/2024 | Zhang | |

OTHER PUBLICATIONS

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0'Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

Bosch et al., "Towards Automated Detection of Data Pipeline Faults", 2020 27th Asia-Pacific Software Engineering Conference (APSEC). IEEE, pp. 346-355 (Year: 2020).

Grafberger et al., Towards Interactively Improving ML Data Preparation Code via "Shadow Pipelines", DEEM '24: Proceedings of the Eighth Workshop on Data Management for End-to-End Machine Learning, published on Jun. 9, 2024, retrieved from <https://doi.org/10.1145/3650203.3663327> on Aug. 11, 2025 (5 pages).

Rodriguez-Esteban, "Biocuration with insufficient resources and fixed timelines", 2015, Oxford University Press, pp. 1-9. (Year: 2015).

Stonebraker et al., "Data Curation at Scale: The Data Tamer System", 6th Biennial Conference on Innovative Data Systems Research (CIDR '13), Jan. 6-9, 2013, 10 pps. (Year: 2013).

T. Leemann et al., "I Prefer not to say: Protecting User Consent in Models with Optional Personal Data", retrieved from <https://arxiv.org/abs/2210.13954v4> Version 4, Jun. 6, 2023, pp. 1-32 (32 pages).

* cited by examiner

Data Field Dependencies 400

| Input | Output | Level of Accuracy |
| --- | --- | --- |
| Field 1 | Field 4 | 5 |
| Field 3 | Field 2 | 6 |
| Field 2 | Field 5 | 3 |
| Field 5 | Field 1 | 2 |

Reliability Range 402

Maximum Level of Accuracy: 6
Minimum Level of Accuracy: 3

FIG. 4A

Training Data
404

| Input | Output | Level of Accuracy |
| --- | --- | --- |
| Field 1 | Field 4 | 5 |
| Field 2 | Field 5 | 3 |

FIG. 4B

ENSURING COMPLIANCE OF DATA FOR USE IN A DATA PIPELINE WITH LIMITATIONS ON DATA COLLECTION

FIELD

Embodiments disclosed herein relate generally to data management. More particularly, embodiments disclosed herein relate to systems and methods to manage data using a data pipeline.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 4A-4D show block diagrams illustrating a system in accordance with an embodiment over time.

DETAILED DESCRIPTION

Figure 1:
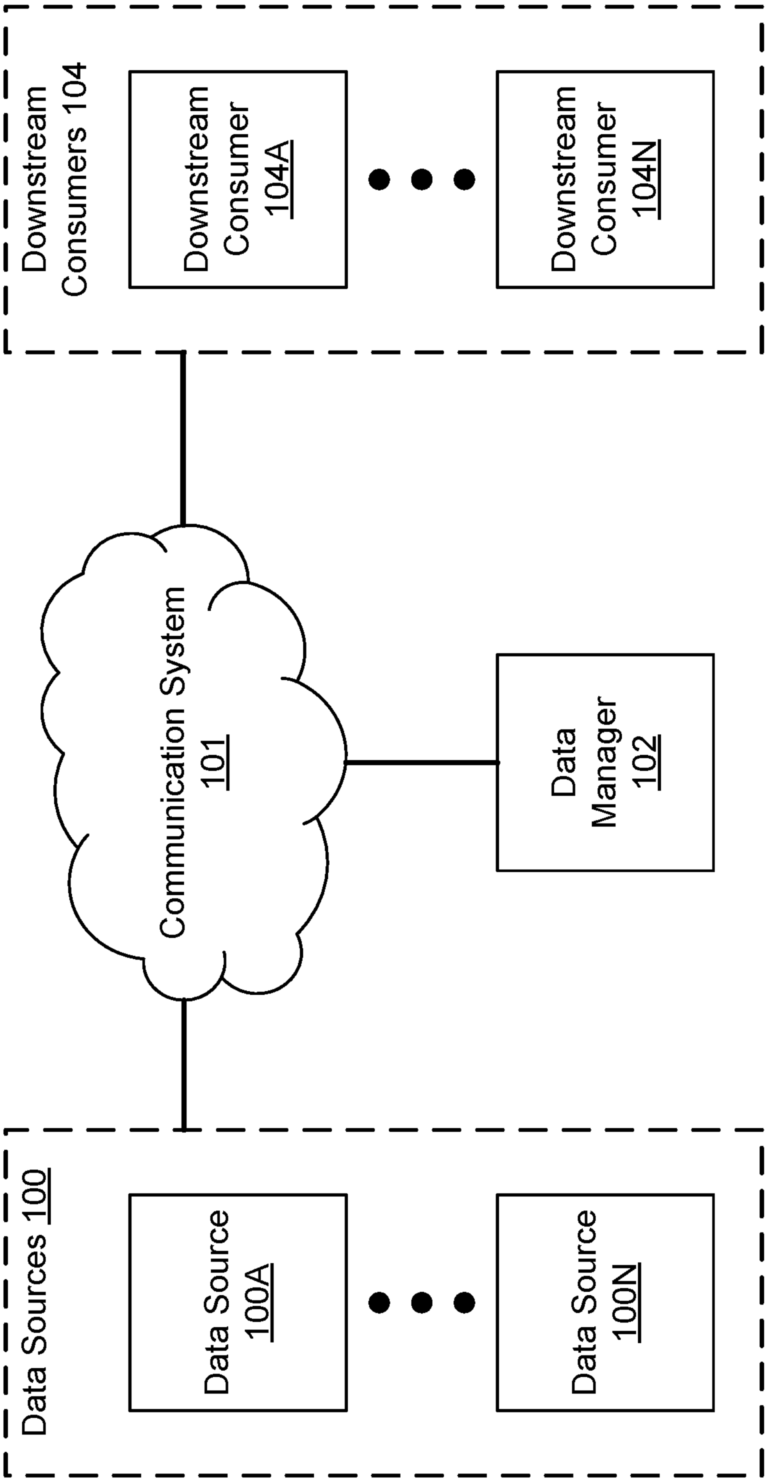
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data pipeline. A data pipeline may ingest raw data (e.g., unstructured data), transform the raw data into usable formats (e.g., as required by a destination data repository of the data pipeline), and store data (e.g., within a data repository) for use by downstream consumers. For example, downstream consumers may rely on the stored data to be accessible in order to provide computer-implemented services.

Managing the operation of a data pipeline may include obtaining a request for data and/or determining the availability of the data. The data may be unavailable, for instance, if access to the data is restricted via a data manager or if the data is not obtainable from a data source. Access to the data may be restricted or not obtainable due to data privacy regulations (e.g., general data protection regulation (GDPR)) and/or other data regulatory frameworks. In addition, data may be unavailable due to any number of user selected limitations (e.g., preferences selected by a user indicating fields of the data that are available and fields of data that are unavailable). Data inaccessibility in a data pipeline may interrupt and/or hinder the performance of the data pipeline (e.g., via misalignment of application programming interfaces (APIs)) and, thereby, obstruct a downstream consumer's ability to provide computer-implemented services based on the data.

The data pipeline may utilize one or more data processing systems to manage the operation of the data pipeline, which may include synthetic data generation when the data is determined to be inaccessible or limited to disclosure. Synthetic data generation may include using a trained inference model to generate synthetic data (e.g., predictions for the inaccessible data meant to be treated as a substitute for the inaccessible data for downstream use of the data) for which may be implemented in the data pipeline when the requested data is inaccessible. For example, synthetic data generation may be implemented in order to provide synthetic data to a downstream consumer when the requested data is inaccessible (e.g., all of the data and/or a portion of the data is unavailable). By doing so, embodiments disclosed herein may provide a system for generating synthetic data when at least a portion of the data requested is inaccessible. The generation of synthetic data to supplement fully and/or partially unavailable requested data may reduce failures of the data pipeline (e.g., due to the inability to provide requested data) as a result of inaccessible data in the data pipeline.

Data associated with one or more users may be requested by a downstream consumer. Each portion of the data associated with a different user of the one or more users may be associated with different limitations for information collection (e.g., due to data privacy regulations, user selected limitations, etc.). Therefore, a first portion of the data (e.g., associated with a first user) may include a first type of the data (e.g., the user's age, the user's address, the user's email address, etc.) and a second portion of the data may not include the first type of the data. Consequently, to obtain a supplemented data set usable by the downstream consumer, the inference model may generate synthetic data usable to supplement unpopulated fields of the data depending on the limitations on information collection.

However, a single inference model (e.g., a first inference model) may predict some fields of the data more reliably than other fields of the data. To reliably predict each unavailable field of the data, multiple inference models may be required, each inference model of the multiple inference models being trained using different training data based on the intended inference generation capabilities. Doing so may consume a quantity of computing resources that is unavailable or undesirable for the system (e.g., to train, host, and/or operate the multiple inference models).

To predict unavailable fields of the data without training and/or operating a large number of the inference models, a single inference model (e.g., the first inference model) may be trained using training data determined by a second inference model. The second inference model may perform a self-supervised learning process to qualify which fields of the data are predictable using other fields of the data.

For example, the self-supervised learning process may yield training data, the training data including a series of potential input fields, corresponding output fields (e.g., labels), and a level of accuracy associated with each prediction. Each level of accuracy may be compared to a reliability range (e.g., the reliability range being determined, for example, in response to the needs of a downstream consumer and in order to ensure compliance of the synthetic data with the limitations on information collection). A portion of the training data (e.g., a portion of the pairs of input fields and corresponding output fields) with corresponding levels of accuracy that fall within the reliability range may be used to train the first inference model.

Subsequently, the first inference model may predict unpopulated fields of the data using other fields of the data. When the obtained data includes a populated field and an unpopulated field, the unpopulated field may be compared to the unpopulated fields capable of being predicted by the first inference model (e.g., the input fields and corresponding output fields described above) to determine whether synthetic data may be generated. If the unpopulated field is able to be predicted using the first inference model, synthetic data may be generated using at least the populated field of the data. The synthetic data may be added to the data to obtain supplemented data. The supplemented data may then be inputted in the data pipeline (e.g., provided to a downstream consumer to perform computer-implemented services using the supplemented data).

By doing so, data including unpopulated fields may be supplemented with synthetic data when the synthetic data is able to be generated within the reliability range. Consequently, interruptions to operation of the data pipeline (and/or the subsequent computer-implemented services based on data provided by the data pipeline) may be reduced.

In an embodiment, a method for managing operation of a data pipeline is provided. The method may include: obtaining data comprising a populated field and an unpopulated field, the unpopulated field lacking information due to limitations on information collection; making a determination regarding whether a first inference model can predict at least the unpopulated field within a reliability range, the reliability range ensuring that inferences generated by the first inference model comply with the limitations; in an instance of the determination in which the first inference model can predict the at least the unpopulated field: generating an inference using the first inference model; populating the unpopulated field using the inference to obtain supplemented data; and providing the supplemented data to a downstream consumer.

The method may also include: prior to obtaining the data: using a second inference model to qualify which fields of the data are predictable using other fields of the data; and performing a training process based on the fields of the data that are predictable to obtain the first inference model.

The fields may be qualified such that the other fields of the data may be predictable by at least a minimum level of accuracy but less than a maximum level of accuracy.

The method may also include: obtaining second data comprising the populated field and a second populated field, the second populated field comprising information due to second limitations on the information collection, and content of the second populated field being barred by the limitations.

The data may be in regard to a first user, and the second data may be in regard to a second user.

Making the determination may include: identifying a type of the unpopulated field; and identifying that the type of the unpopulated field is one of the types of the unpopulated fields for which the inferences are generated by the first inference model.

The first inference model may be based on qualified training data, the qualified training data comprising a subset of all available training data, the subset of the all available training data being selected based on a second inference model.

The subset of the all available training data may also be selected based on the reliability range.

The subset of the all available training data may include a set of features that prevents perfect prediction of labels of the training data by the first inference model.

The second inference model may be a self-supervised learning inference model, and the first inference model may be a supervised learning inference model.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer-instructions are executed by the processor.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of personal electronic devices (e.g., desktop computers, cellphones, etc.) and/or any other devices operated by individuals to collect measurements related to computing equipment usage for individuals. Data sources 100 may be associated with a data pipeline and, therefore, may collect the measurements, may perform processes to sort, organize, format, and/or otherwise prepare the data for future processing in the data pipeline, and/or may provide the data to other data processing systems in the data pipeline (e.g., via one or more APIs).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data manager 102 may obtain the data (the computing equipment usage measurements) from data sources 100 as part of the data pipeline. Data manager 102 may obtain the data via a request through an API and/or via other methods. Data manager 102 may curate the data (e.g., identify errors/omissions and correct them, etc.) and may store the curated data temporarily and/or permanently in a data lake or other storage architecture. Following curating the data, data manager 102 may provide the data to other entities for use in performing the computer-implemented services.

Data managed by data manager 102 (e.g., stored in a data repository managed by data manager 102, obtained directly from internet of things (IoT) devices managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the computing equipment usage measurements from data manager 102 as input data for customer service models. Specifically, downstream consumers 104 may utilize the data related to an individual (e.g., a user's) past and current computing equipment needs, as well as other information about the individual, to simulate future computing equipment needs of the individual. By doing so, advertisements, offers for discounts, and/or other targeted plans may be initiated based on the projected computing equipment needs of the individual.

However, the ability of downstream consumers 104 to provide (and/or participate in and/or support the) computer-implemented services may depend on the availability of the data (e.g., access to the data). In some instances, at least a portion of the data may be unavailable (e.g., not accessible) to downstream consumers 104 based on a break in communication (e.g., due to misalignment of an API), for example, between data sources 100 and data manager 102 resulting in a lack of expected data available from data manager 102.

For example, the data requested by downstream consumers 104 may include portions of data not accessible via data manager 102 due to, for example, a restriction or limitation of disclosure associated with the type of data requested from data sources 100. Data sources 100 may be unable to service a request for data (e.g., provide the data to data manager 102) due to communication break down between data sources 100 and data manager 102 (e.g., data privacy restrictions and/or user selected limitations to disclose the data to data manager 102), and/or any other issues that may impede the ability to provide the data to data manager 102. If data sources 100 are unable to provide the requested data to data manager 102, data manager 102 may not be able to provide the requested data to the requestor (e.g., downstream consumers 104) resulting in a misalignment of the data pipeline and, therefore, an unexpected interruption to the computer-implemented services provided based on the data.

In addition, in some instances, at least a portion of the requested data may be inaccessible to the requestor (e.g., downstream consumers 104) based on a break in communication (e.g., due to misalignment of an API), for example, between data manager 102 and downstream consumers 104, resulting in an inability to provide data via data manager 102 (e.g., unable to service the request for data). For example, the data requested by downstream consumers 104 may include portions of data subject to data privacy regulations and/or user selected limitations on information collection that hinder the disclosure of the data (e.g., via data manager 102) to downstream consumers 104.

In general, embodiments disclosed herein may provide methods, systems, and/or devices for remediating misalignment of the data pipeline due to unavailability of data usable to provide computer-implemented services (e.g., based on limitations for information collection). To do so, the system of FIG. 1 may utilize a first inference model to generate synthetic data (e.g., non-real data) based on the requested data (and/or any accessible data) and may provide the synthetic data to other data processing systems associated with the data pipeline (e.g., downstream consumers 104, and/or other entities) to facilitate the utilization of data for the computer-implemented services.

However, data associated with a first user may omit a first type of information and data associated with a second user may omit a second type of information (while providing the first type of information). Reliably generating inferences to predict various types of information may be performed using a large number of trained inference models (e.g., one inference model for each set of user preferences), which may increase the computing resource expenditure of the system (e.g., to train, host, and/or operate the large number of trained inference models). Consequently, it may be desirable to only use a single inference model for data imputation to reduce resource expenditures.

In addition, due to the modular nature of limitations on information collection (e.g., by geographic region, by user preference, and/or by other means), the first inference model may not be able to reliably impute both the first type of information and the second type of information.

To generate synthetic data to supplement the data provided by a user using a single inference model (e.g., the first inference model) while ensuring that the synthetic data is reliable, a second inference model may be used. The second inference model may perform self-supervised learning to identify fields of the data that may be predicted with a level of accuracy within a reliability range using other fields of the data. The reliability range may be determined so that the synthetic data is usable by downstream consumers 104 but does not infringe the limitations on information collection (e.g., by imputing a value identical to and/or too near to the true value). The first inference model may be trained based on these relationships.

When data including unpopulated fields are obtained, the system of FIG. 1 may determine whether the unpopulated fields are able to be predicted within the reliability range using the populated fields as ingest for the first inference model. If the unpopulated fields are able to be predicted within the reliability range, the first inference model may generate inferences usable to supplement the unpopulated fields to obtain supplemented data. The supplemented data may then be inputted into the data pipeline, provided to downstream consumers 104, used to provide computer-implemented services, etc. By doing so, a single inference model (e.g., the first inference model) may be used to impute missing values reliably when certain fields of the data are unavailable in incoming data rather than the system employing multiple inference models (e.g., which may increase the computing resource consumption of the system).

To perform the above noted functionality, the system of FIG. 1 may: (i) obtain data including a populated field and an unpopulated field, and/or (ii) determine whether the first inference model can predict at least the unpopulated field within a reliability range. If the first inference model can predict the at least the unpopulated field within the reliability range, the system of FIG. 1 may: (i) generate an inference using the first inference model, (ii) populate the unpopulated field using the inference to obtain supplemented data, and/or (iii) provide the supplemented data to a downstream consumer.

When performing its functionality, data sources 100, data manager 102, and/or downstream consumers 104 may perform all, or a portion, of the methods and/or actions shown in FIGS. 2A-3B.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
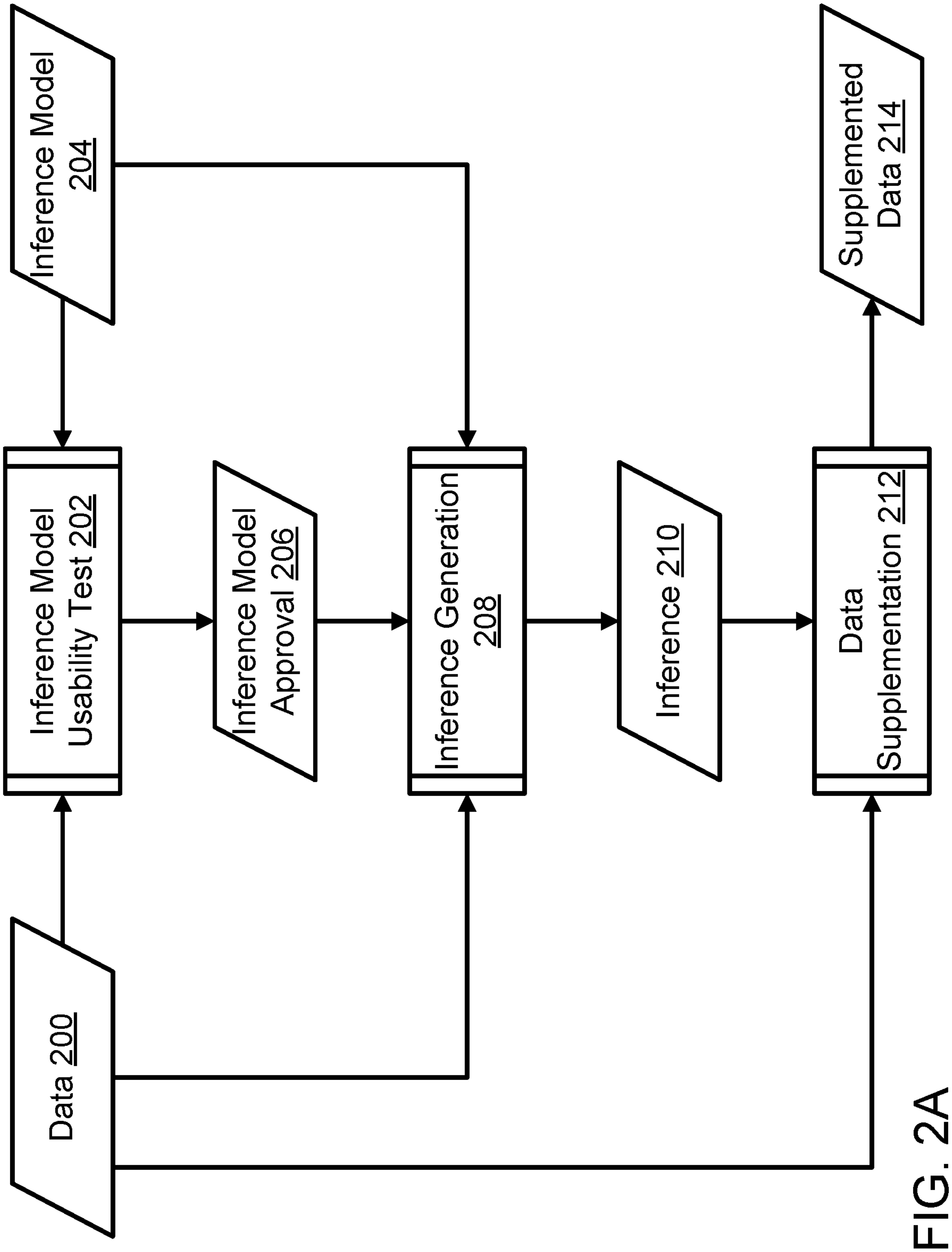
FIG. 2A shows a data flow diagram illustrating a process of obtaining supplemented data in accordance with an embodiment.
Figure 2B:
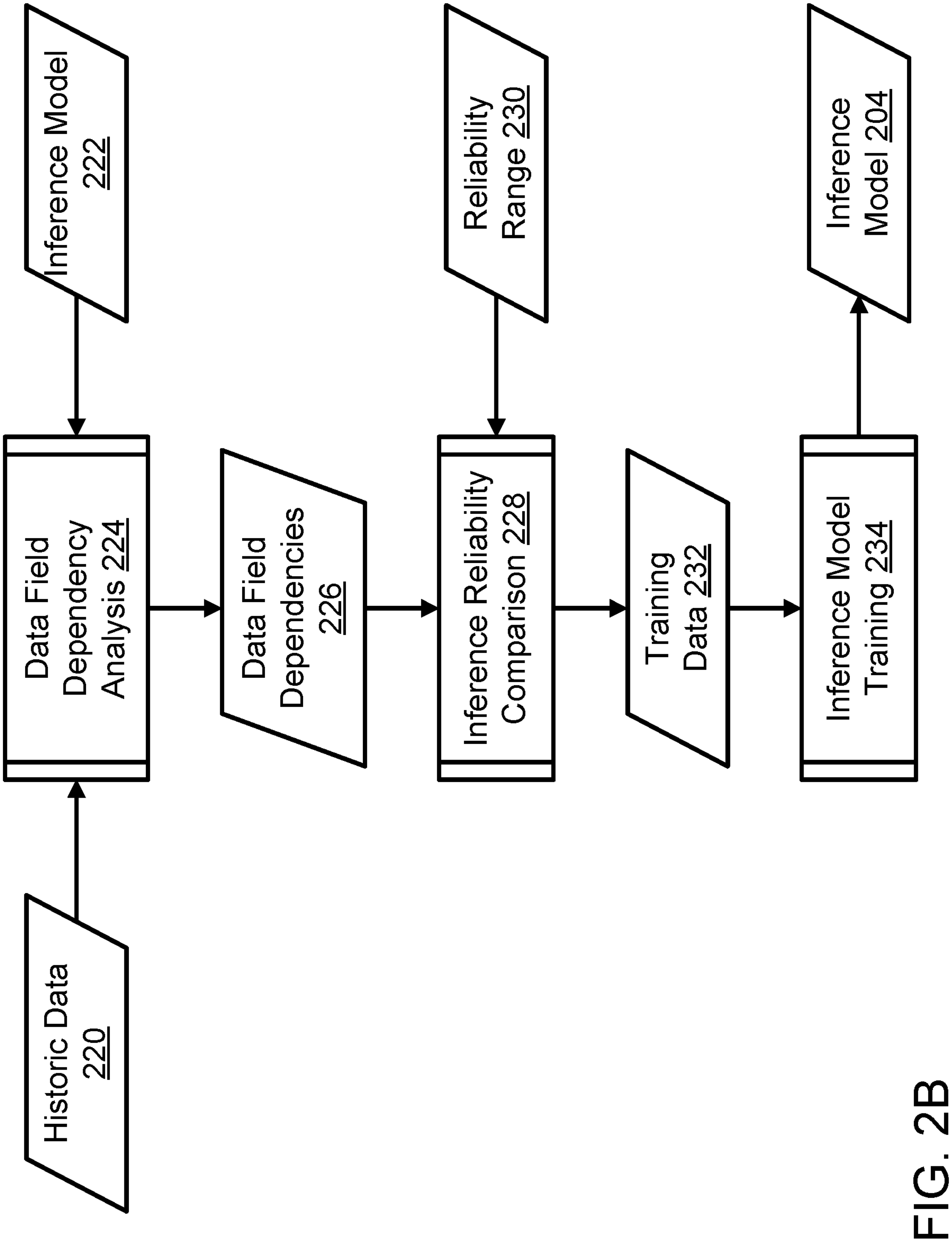
FIG. 2B shows a data flow diagram illustrating a process of obtaining an inference model usable to supplement the unpopulated fields of the data in accordance with an embodiment.

To further clarify embodiments disclosed herein, diagrams illustrating data flows implemented by a system over time in accordance with an embodiment are shown in FIGS. 2A-2B.

Turning to FIG. 2A, a first data flow diagram illustrating a process of obtaining supplemented data in accordance with an embodiment is shown.

As discussed above, one or more of data sources 100, data manager 102, and/or downstream consumers 104 (shown in FIG. 1) may form (fully or in part) a data pipeline in which data may be collected, processed, stored, shared and/or otherwise prepared for providing to other data processing systems to service a request for the data. In some instances, a portion of the data may be inaccessible (e.g., a field of the data may be unpopulated) due to limitations on information collection.

To manage operation of the data pipeline, the system may obtain data 200. Data 200 may include any amount of data related to any number of users (and/or other data). For example, data 200 may include first data, and first data may be in regard to a first user. The first data may include at least a populated field and an unpopulated field, the unpopulated field lacking information due to the first user's limitations on information collection (e.g., based on data privacy regulations, user selected preferences, etc.). The first data may include information related to the first user's personal information, online activity, past behavior, etc. and may be collected from any number of data sources associated with the first user.

For example, data associated with the first user may omit a first type of information associated with the unpopulated field (e.g., via the first user not inputting the first type of the information into a graphical user interface (GUI), by operating in a region subject to data privacy restrictions related to the first type of information, etc.). In contrast, the data associated with the first user may allow a second type of information associated with the populated field to be accessible.

In contrast, data 200 may also include second data, the second data including the populated field and a second populated field. The second data may be in regard to a second user. The second populated field may include information due to second limitations (e.g., based on data privacy regulations, user selected preferences, etc.) on information collection, and content of the second populated field being barred by the limitations. Therefore, the content of the second populated field may correspond to the unpopulated field of the first data. The second data may include information related to the second user's personal information, online activity, past behavior, etc. and may be collected from any number of data sources associated with the second user.

Therefore, different fields may be unpopulated for data associated with different users based on limitations on information collection associated with each user. The first data and the second data of data 200 (and/or additional data) may be encapsulated in a data structure and may be obtained from any number of data sources associated with the data pipeline.

In order to provide data 200 to downstream consumers associated with the data pipeline (e.g., similar to downstream consumers 104 shown in FIG. 1), the system may impute synthetic data to populate at least the unpopulated field using inference model 204. However, inference model 204 may only be able to impute certain types of data using the information provided by the populated fields included in data 200. To determine whether the type of data associated with the unpopulated field is able to be imputed by inference model 204, the system may perform inference model usability test 202 process.

Inference model usability test 202 process may include obtaining the information included in the populated field (e.g., and/or other available data) from data 200 and comparing the information to any number of input fields for inference model 204. Inference model 204 may include any type of predictive model (e.g., a neural network inference model) trained to predict certain types of data based on other types of data. For additional details regarding the process of training inference model 204, refer to FIG. 2B.

Inference model 204 may include metadata indicating relationships between types of data that are able to be imputed, may include an API indicating input fields that are usable to impute the unpopulated field, and/or may indicate via other methods whether the unpopulated field of data 200 is able to be imputed by inference model 204.

Inference model usability test 202 process may result in obtaining inference model approval 206. Inference model approval 206 may include a notification encapsulated in a data structure indicating that the unpopulated field is able to be imputed using at least the populated field within a reliability range. The reliability range may ensure that inferences generated by the first inference model comply with the limitations and the reliability range may be previously obtained by the system from another entity (e.g., a downstream consumer of downstream consumers 104, etc.). Refer to FIG. 2B for additional details regarding the reliability range.

The generation of inference model approval 206 may initiate inference generation 208 process. Inference generation 208 process may utilize at least the populated field of data 200 and inference model 204 to obtain inference 210. Inference generation 208 process may include ingesting the at least the populated field of data 200 into inference model 204 and obtaining inference 210 as an output from inference model 204. Inference 210 may include synthetic data usable to populate the unpopulated field of data 200.

Inference 210 may be used for data supplementation 212 process to obtain supplemented data 214. Data supplementation 212 process may include obtaining data 200, identifying the unpopulated field of data 200, populating the unpopulated field with the synthetic data from inference 210 and encapsulating the resulting populated fields of data 200 in a data structure as supplemented data 214. Supplemented data 214 may be: (i) added to the data pipeline, (ii) provided to one or more downstream consumers of downstream consumers 104, (iii) used by downstream consumers 104 to perform computer-implemented services, and/or (iv) may be used for other purposes.

Turning to FIG. 2B, a second data flow diagram illustrating a process of obtaining an inference model usable to supplement the unpopulated fields of the data (e.g., inference model 204 shown in FIG. 2A) in accordance with an embodiment is shown.

Inference model 204 (shown in FIG. 2A) may be based on qualified training data, the qualified training data including a subset of all available training data, and the subset of the all available training data being selected based on a second inference model (e.g., inference model 222). Inference model 204 may be a supervised learning inference model and inference model 222 may be a self-supervised learning inference model. Inference model 204 may be a supervised learning inference model due to being trained using labeled training data. In contrast, inference model 222 may be a self-supervised learning inference model due to being trained using un-labeled training data.

To obtain inference model 204, the system may first determine which fields of data may be predicted within a reliability range using other fields of the data. To do so, data field dependency analysis 224 process may be performed. Data field dependency analysis 224 process may include performing a self-supervised learning process using inference model 222 and historic data 220 to obtain data field dependencies 226.

Historic data 220 may include a log of any number of historic data sets including a previously determined set of populated fields of user information. The populated fields of historic data 220 may include the type of data associated with the populated field and the type of data associated with the unpopulated field of data 200 shown in FIG. 2A. Inference model 222 may perform self-supervised learning using historic data 220 as training data for inference model 222 as part of data field dependency analysis 224. Inference model 222 may be any type of predictive model (e.g., a neural network inference model).

Data field dependency analysis 224 process may generate data field dependencies 226. Data field dependencies 226 may include a data structure indicating fields of historic data 220 that may be used as ingest to impute other fields of historic data 220. Data field dependencies 226 may also include a level of accuracy for each prediction suggested by data field dependencies 226.

For example, a first field of historic data 220 used as ingest to predict a second field of historic data 220 may have a first level of accuracy. In addition, the first field of historic data 220 used as ingest to predict a third field of historic data 220 may have a second level of accuracy. The first level of accuracy and the second level of accuracy may be different and, therefore, inference reliability comparison 228 process may be performed to determine which fields may be imputed (e.g., predicted) with a level of accuracy within the reliability range in order for data (e.g., data 200 shown in FIG. 2A) to be supplemented using synthetic data.

Inference reliability comparison 228 process may include comparing the levels of accuracy indicated by data field dependencies 226 to reliability range 230. Reliability range 230 may be provided by one or more downstream consumers (e.g., downstream consumers 104), and/or may be obtained from any other entity. Reliability range 230 may include a minimum level of accuracy for imputing data for use by the data pipeline and a maximum level of accuracy for imputing data for use by the data pipeline. For example, levels of accuracy may be represented as a percentage and the reliability range may include a maximum percent accuracy for imputed data and a minimum percent accuracy for imputed data.

Therefore, inference reliability comparison 228 process may qualify the fields of the data such that the other fields of the data are predictable by at least the minimum level of accuracy but less than the maximum level of accuracy. The minimum level of accuracy may ensure that any inferences generated by the first inference model are usable by the data pipeline (e.g., and or downstream consumers associated with the data pipeline). The maximum level of accuracy may ensure that the inferences generated by the first inference model are not accurate enough to infringe the limitations on information collection. Even though the actual data may not be available, an imputed value substituting for the actual data may be accurate to a degree that causes the system to be out of compliance with the limitations.

Training data 232 may be obtained following inference reliability comparison 228. Training data 232 may include qualified training data and may include a listing of fields of historic data 220 that are able to be imputed by an inference model (e.g., inference model 204) with a level of accuracy within reliability range 230 and corresponding input fields. Therefore, training data 232 may include a labeled dataset of ingest features and output features (e.g., the fields that may be reliably predicted) for use in training inference model 204 (described in FIG. 2A).

Training data 232 may include a subset of all available training data (e.g., a portion of the all available training data with a degree of accuracy within the reliability range). The subset of the all available training data may be selected based on the second inference model (e.g., the results of the self-supervised learning process performed to obtain data field dependencies 226. The subset of the all available training data may also be selected based on the reliability range (e.g., via ensuring that all of the subset of the all available training data has a level of accuracy within the reliability range). The subset of the all available training data may include a set of features that prevents perfect prediction of labels of training data 232 by the inference model 204. Therefore, training data 232 may include a series of input values and corresponding labels for each input value of the series of the input values. Each input value and label may be sourced from live data (e.g., depending on the limitations on information collection), may include an imputed label based on other predictions, etc.

For example, the all available training data may include a first input value and a first label (e.g., an output value). A level of accuracy of the first input value and the first label may indicate a 99% accurate prediction. Therefore, training inference model 204 using the first input value and the first label may result in inference model 204 generating inferences that may be 99% accurate (e.g., close to the true value that was withheld). Use of a value that may only deviate from the withheld value by approximately 1% may violate limitations on information collection for the withheld value. Therefore, the first input value and the first label may not be included in training data 232.

However, a second input value and a second label may have a level of accuracy that indicates a 65% accurate prediction. Use of a value that may deviate by approximately 35% from the withheld value may be considered acceptable based on the limitations on information collection. Subsequently, the second input value and the second label may be included in training data 232.

To train inference model 204, the system may perform inference model training 234 process using training data 232. Inference model training 234 process may include a supervised learning process during which a neural network inference model is trained using a labeled dataset (e.g., training data 232). By doing so, inference model 204 may be trained to predict certain types of data when other types of data are available as ingest. The inferences generated by inference model 204 may have a level of accuracy considered appropriate for use by the data pipeline via reliability range 230.

In an embodiment, the one or more entities performing the operations shown in FIG. 2A-2B are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
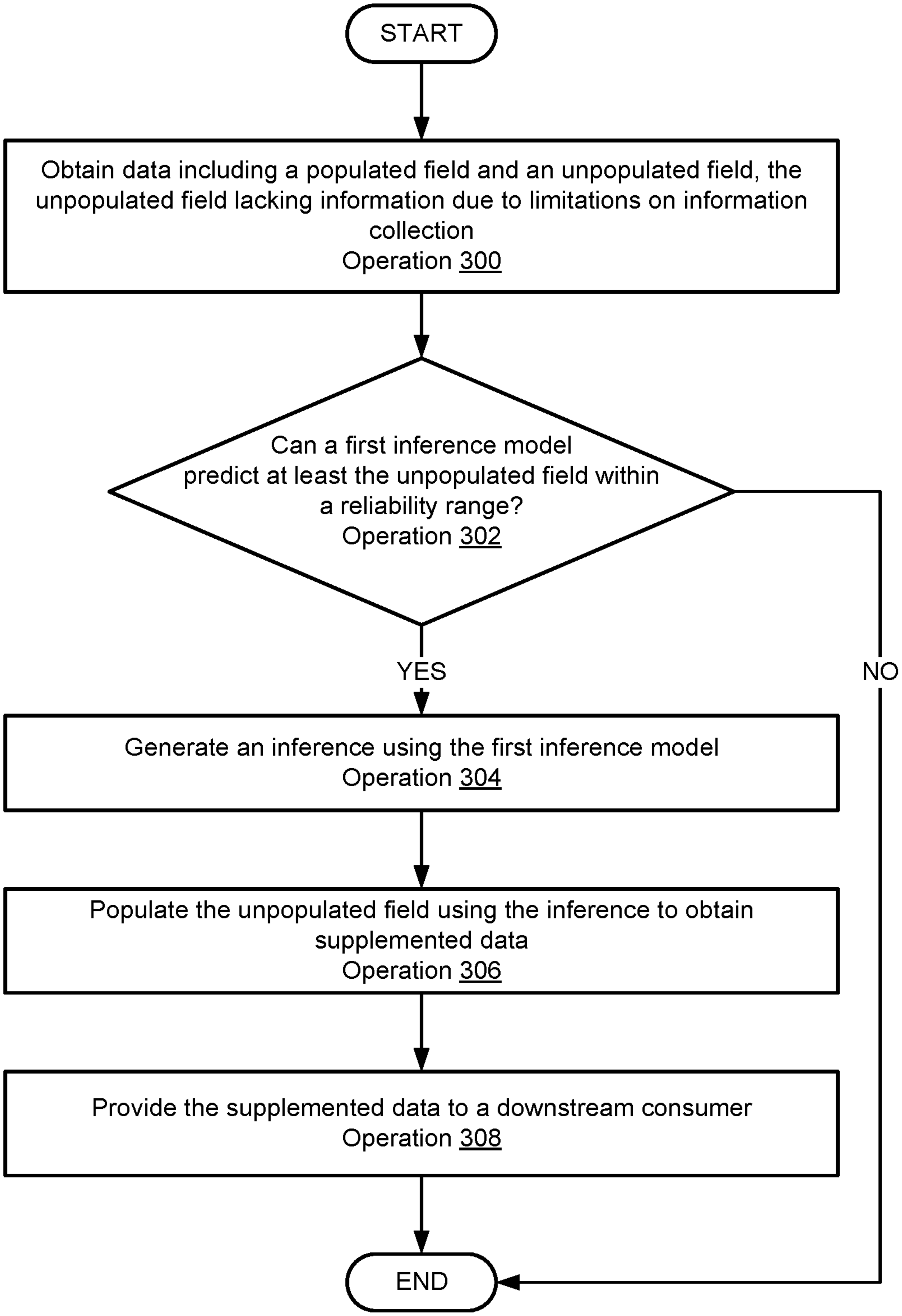
FIG. 3A shows A flow diagram illustrating methods of managing operation of a data pipeline in accordance with an embodiment.
Figure 3B:
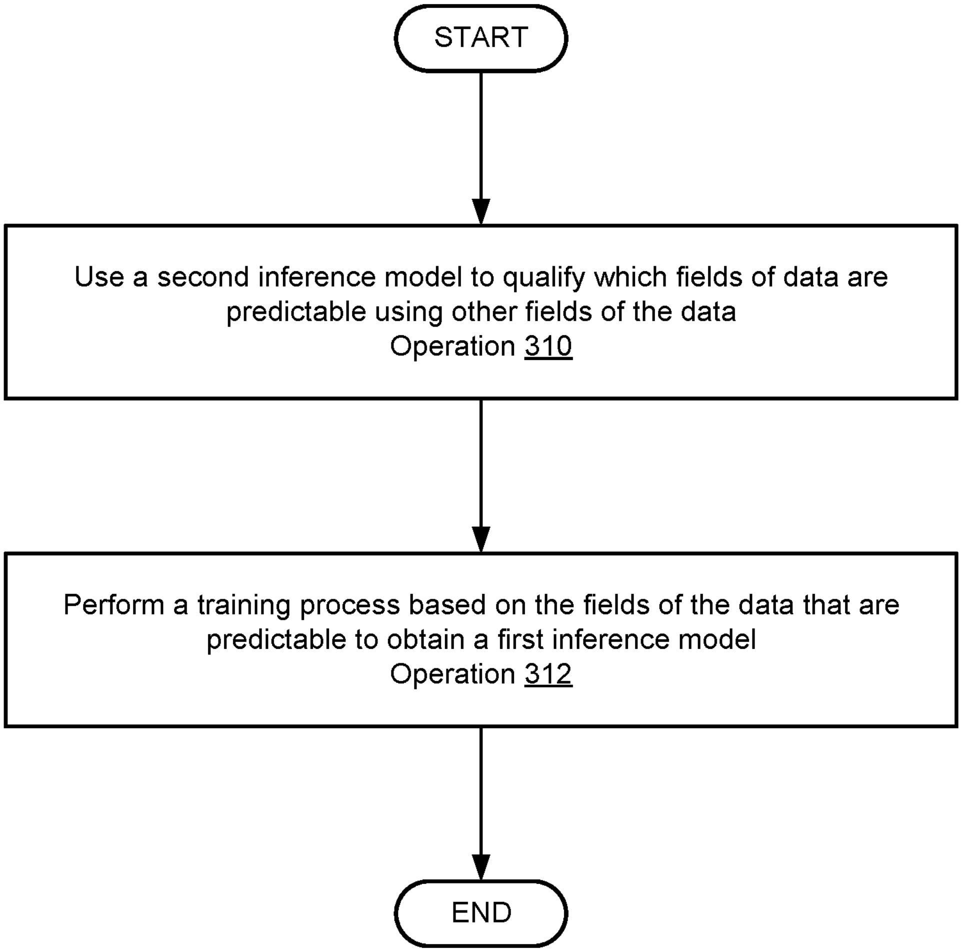
FIG. 3B shows a flow diagram illustrating methods of obtaining an inference model trained to predict unpopulated fields of data in accordance with an embodiment.

As discussed above, the components of FIG. 1 may perform various methods to manage operation of a data pipeline. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method for managing operation of a data pipeline in accordance with an embodiment is shown. The method may be performed by any of data sources 100, data manager 102, downstream consumers 104, and/or other entities without departing from embodiments disclosed herein.

At operation 300, data including a populated field and an unpopulated field is obtained, the unpopulated field lacking information due to limitations on information collection. Obtaining the data may include: (i) receiving the data as a transmission from one or more data sources associated with the data pipeline, (ii) reading the data from storage, (iii) obtaining an identifier (e.g., key for a lookup table) from an entity and using the identifier to perform a lookup process using a data lookup table and the identifier as the key for the lookup process (e.g., in a database), and/or (iv) via other methods.

Second data may also be obtained (prior to obtaining the data, simultaneously with obtaining the data, and/or following obtaining the data). The second data may include the populated field and a second populated field, the second populated field including information due to second limitations on the information collection, and content of the second populated field being barred by the limitations.

Obtaining the second data may include: (i) receiving the second data as a transmission from one or more data sources associated with the data pipeline, (ii) reading the second data from storage, (iii) obtaining an identifier (e.g., key for a lookup table) from an entity and using the identifier to perform a lookup process using a data lookup table and the identifier as the key for the lookup process (e.g., in a database), and/or (iv) via other methods.

At operation 302, it is determined whether a first inference model can predict at least the unpopulated field within a reliability range. Determining whether the first inference model can predict the at least the unpopulated field within the reliability range may include: (i) identifying a type of the unpopulated field, (ii) identifying that the type of the unpopulated field is one of the types of the unpopulated fields for which the inferences are generated by the first inference model, and/or (iii) other methods.

Identifying the type of the unpopulated field may include: (i) obtaining an identifier associated with the unpopulated field by analysis of the data (e.g., a label obtained via a report indicating fields of an API where no response was provided when the data was requested), (ii) reading the type of the unpopulated field from storage, (iii) querying another entity to determine the type of the unpopulated field, and/or (iv) other methods.

Identifying that the type of the unpopulated field is one of the types of the unpopulated fields for which the inferences are generated by the first inference model may include: (i) obtaining a list of the types of the unpopulated fields for which the inferences are generated by the first inference model and/or (ii) comparing the type of the unpopulated field to the list of the types of the unpopulated fields.

Obtaining the list of the types of the unpopulated fields may include: (i) reading the list from storage (e.g., metadata associated with the inference model), (ii) accessing a database including the list, (iii) receiving the list from another entity in the form of a message over a communication system, (iv) generating the list.

Comparing the type of the unpopulated field to the list may include: (i) feeding the type of the unpopulated field into an inference model or rules-based engine to determine whether the type of the unpopulated field matches any of the list, (ii) performing a lookup process using the type of the unpopulated field as a key for a lookup table, and/or (iii) other methods.

If the first inference model can predict the at least the unpopulated field within the reliability range, the method may proceed to operation 304. If the first inference model cannot predict the at least the unpopulated field within the reliability range, the method may end following operation 302.

At operation 304, an inference is generated using the first inference model. Generating the inference using the first inference model may include: (i) obtaining at least the populated field of the data, (ii) ingesting the at least the populated field as input for the first inference model, and/or (iii) obtaining the inference as an output from the first inference model.

Generating the inference using the first inference model may also include: (i) providing the inference model and the at least the populated field of the data to another entity responsible for inference generation and/or (ii) receiving the inference in response from the entity.

At operation 306, the unpopulated field is populated using the inference to obtain supplemented data. Populating the unpopulated field using the inference may include: (i) generating a data structure including the at least the populated field and the inference and treating the data structure as the supplemented data, (ii) providing the inference and the data to another entity responsible for generating the supplemented data, (iii) modifying the existing data structure associated with the data to add the inference to the unpopulated fields and re-naming the data as supplemented data, and/or (iv) other methods.

At operation 308, the supplemented data is provided to a downstream consumer. Providing the supplemented data to the downstream consumer may include: (i) providing the supplemented data in the form of a message transmitted over a communication system, (ii) providing the supplemented data to another entity responsible for providing the supplemented data to a downstream consumer, (iii) entering the supplemented data into a database and notifying the downstream consumer (e.g., via a notification in an application on a device) that the supplemented data is available in the database, and/or (iv) other methods.

The method may also include providing a computer-implemented service using the supplemented data provided to the downstream consumer. Providing the computer-implemented service using the supplemented data may include: (i) ingesting the supplemented data into an inference model, the output of the inference model being part of the provided computer-implemented services, (ii) storing the supplemental data (temporarily and/or permanently) in any storage architecture, (iii) providing the supplemented data to another entity, and/or (iv) other methods.

The method may end following operation 308.

Turning to FIG. 3B, a flow diagram illustrating methods of obtaining an inference model trained to predict unpopulated fields of data in accordance with an embodiment is shown. The method may be performed by any of data sources 100, data manager 102, downstream consumers 104, and/or other entities without departing from embodiments disclosed herein. The operations shown in FIG. 3B may be performed prior to the operations shown in FIG. 3A.

At operation 310, a second inference model is used to qualify which fields of data are predictable using other fields of the data. Qualifying which fields of the data are predictable using the other fields of the data may include: (i) performing a self-supervised learning process using the second inference model and historic data, the historic data including a set of unlabeled data indicating types of fields of the data that are populated, (ii) obtaining a labeled dataset as a result of the self-supervised learning process, the labeled dataset including a series of input fields and corresponding output fields of the historic data, (iii) obtaining a level of accuracy for each entry in the series, the level of accuracy indicating a likelihood that the type of information associated with the input field is able to be reliably used to impute the type of information associated with the output field, (iv) comparing each level of accuracy to a reliability range (e.g., indicating a minimum level of accuracy and a maximum level of accuracy) to identify a subset of the labeled dataset, and/or (v) treating the subset of the labeled dataset as the fields of the data that are predictable.

Qualifying which fields of the data are predictable using other fields of the data may also include: (i) providing the historic data to another entity responsible for performing the self-supervised learning process to obtain the fields of the data that are predictable, and/or (ii) receiving the fields of the data that are predictable in response from the entity.

At operation 312, a training process is performed based on the fields of the data that are predictable to obtain a first inference model. Performing the training process may include utilizing the fields of the data that are predictable (e.g., the output fields) and the corresponding fields used to predict them (e.g., the input fields) as a qualified training data set (e.g., a labeled dataset) for use in a supervised learning process to train the first inference model.

Performing the training process may also include providing the qualified training data set to another entity responsible for training the first inference model.

The method may end following operation 312.

Turning to FIG. 4A, consider a scenario in which a self-supervised learning process is performed using a second inference model and an unlabeled data set of historic data as training data for the second inference model. The self-supervised learning process may yield data field dependencies 400. Data field dependencies 400 may include a labeled dataset of input fields and associated output fields. For example, field 1 may be used to predict field 4, field 3 may be used to predict field 2, field 2 may be used to predict field 5, and field 5 may be used to predict field 1. In addition, a level of accuracy may be obtained for each input and output pair. The level of accuracy may be an extent to which the output field may be reliably predicted using the input field on a scale of 1-10 (e.g., with 1 being the least accurate prediction and 10 being the most accurate prediction).

Reliability range 402 may indicate a maximum level of accuracy (of 6) and a minimum level of accuracy (of 3) for input output pairs to be added to a training data set usable to train a first inference model (e.g., an inference model usable to impute missing fields of data for use by a data pipeline). Reliability range 402 may have a minimum level of accuracy in order to ensure that inferences generated by the first inference model are accurate enough (e.g., based on the needs of a downstream consumer) to be usable by the downstream consumer to perform computer-implemented services using the data. Reliability range 402 may have a maximum level of accuracy in order to ensure that inferences generated by the first inference model do not perfectly duplicate unavailable data (or predict too closely) in a manner that may infringe limitations on information collection.

Turning to FIG. 4B, training data 404 may be usable to train the first inference model to predict unpopulated fields of data using populated fields of the data. Training data 404 may include input output pairs from data field dependencies 400 that have a corresponding level of accuracy within reliability range 402.

Figure 4C:
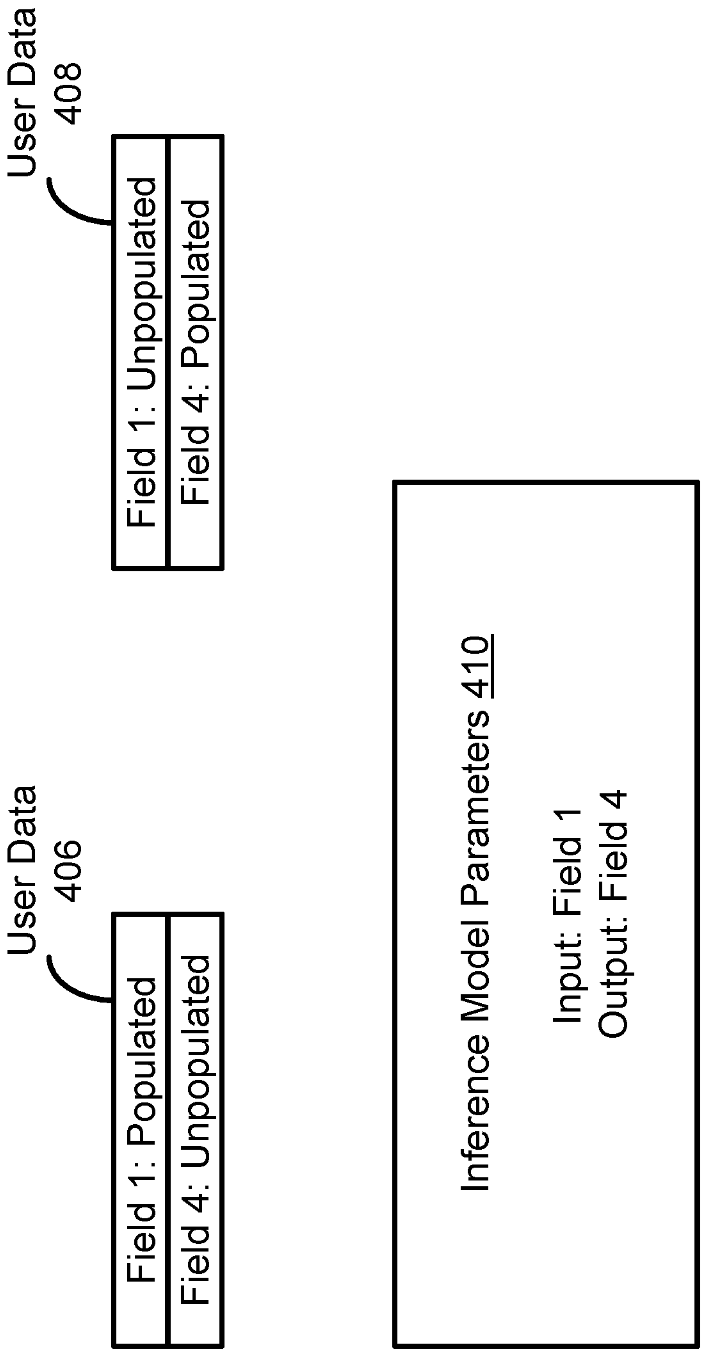

Turning to FIG. 4C, user data 406 and user data 408 may be obtained by a data pipeline and are intended to be provided to one or more downstream consumers associated with the data pipeline in order to provide computer-implemented services based on user data 406 and user data 408. User data 406 may include a first field (field 1) that is populated and a second field (field 4) that is unpopulated. User data 408 may include a first field (field 1) that is unpopulated and a second field (field 4) that is populated.

Prior to providing user data 406 and user data 408 to the downstream consumer, the system may generate synthetic data to supplement the unpopulated fields of user data 406 and user data 408. However, the inference model usable to impute the unpopulated fields (e.g., the first inference model trained using training data 404 shown in FIG. 4B) may only be capable of predicting certain types of data (e.g., corresponding to certain fields of user data 406 and/or user data 408) with sufficient reliability to meet the needs of the downstream consumer. Rather than operating multiple inference models and selecting an inference model for use based on the desired inference, the inference model may be trained to impute certain fields of the data (e.g., those that may be reliably predicted). To determine whether the inference model is trained to reliably impute the unpopulated fields of user data 406 and user data 408, the unpopulated fields may be compared to inference model parameters 410.

Inference model parameters 410 may indicate which fields of data may be reliably imputed using other fields of the data. Specifically, inference model parameters 410 may indicate that field 4 of data may be reliably imputed using field 1 as input for the inference model.

Figure 4D:
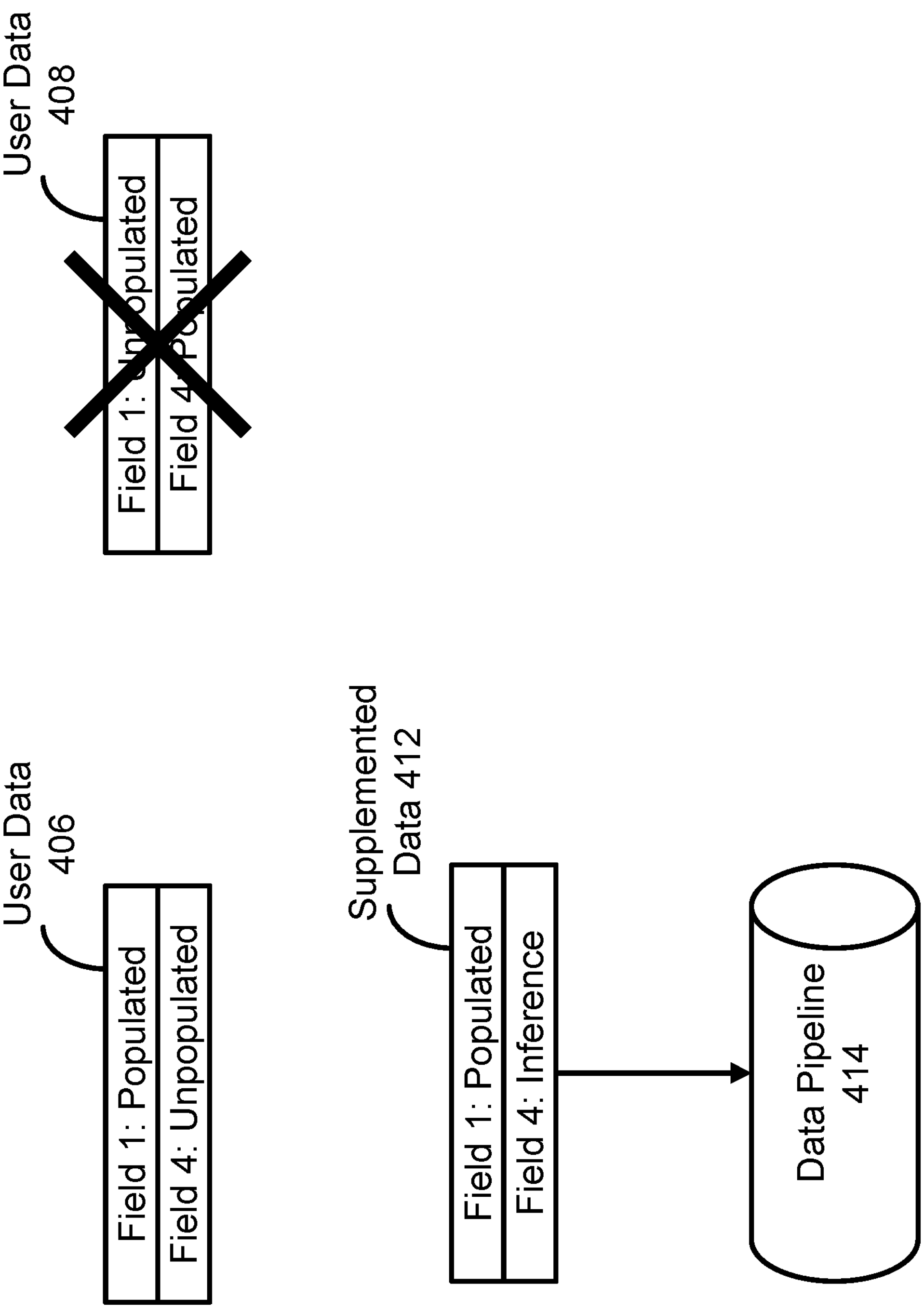

Turning to FIG. 4D, it may be determined that user data 406 may be reliably supplemented and that user data 408 may not be reliably supplemented (e.g., due to the unpopulated field not matching the field that is capable of being imputed via inference model parameters 410). The inference model may then utilize field 1 of user data 406 to generate an inference to substitute for the unpopulated field 4 to obtain supplemented data 412. Supplemented data 412 may then be inputted to data pipeline 414 and may be provided to the downstream consumer via data pipeline 414.

Figure 5:
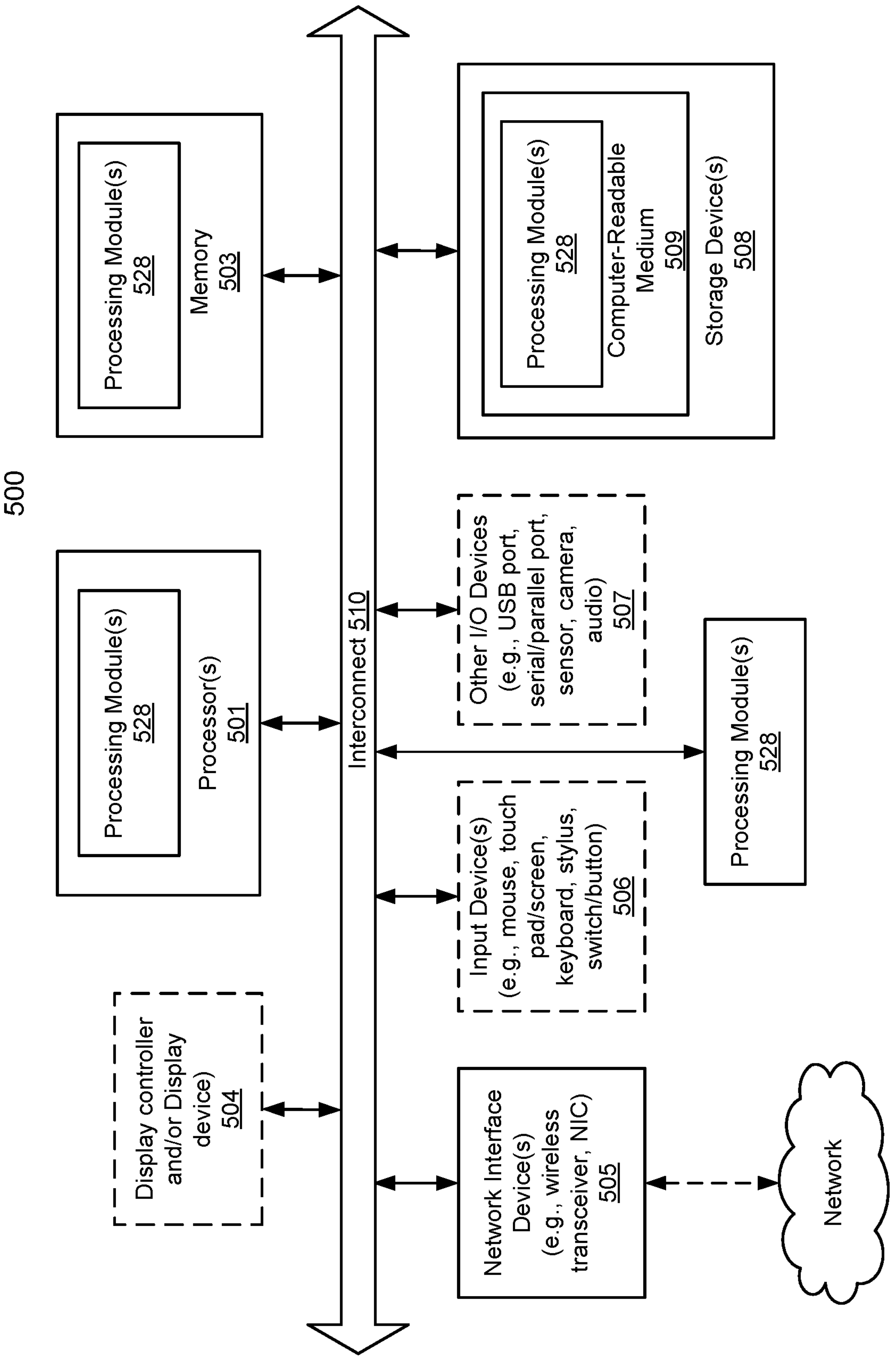
FIG. 5 shows a block diagram illustrating a data processing system in accordance with an embodiment.

Any of the components illustrated in FIGS. 1-4D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of a data pipeline, the method comprising:

obtaining data comprising a populated field and an unpopulated field, the unpopulated field lacking information due to limitations on information collection;

making a determination regarding whether a first inference model can predict at least the unpopulated field within a reliability range, the reliability range ensuring that inferences generated by the first inference model comply with the limitations;

in an instance of the determination in which the first inference model can predict the at least the unpopulated field:

generating an inference using the first inference model;

populating the unpopulated field using the inference to obtain supplemented data; and providing the supplemented data to a downstream consumer, wherein the method further comprises, prior to obtaining the data:

using a second inference model to qualify which fields of the data are predictable using other fields of the data; and performing a training process based on the fields of the data that are predictable to obtain the first inference model, wherein the first inference model is trained based on qualified training data comprising a subset of all available training data, the subset being selected based on the reliability range.

2. The method of claim 1, wherein the fields are qualified such that the other fields of the data are predictable by at least a minimum level of accuracy but less than a maximum level of accuracy.

3. The method of claim 1, further comprising:

obtaining second data comprising the populated field and a second populated field, the second populated field comprising information due to second limitations on the information collection, and content of the second populated field being barred by the second limitations.

4. The method of claim 3, wherein the data regarding a first user, and the second data regarding a second user.

5. The method of claim 1, wherein making the determination comprises:

identifying a type of the unpopulated field; and identifying that the type of the unpopulated field is one of a type of field for which the inferences are generated by the first inference model.

6. The method of claim 5, wherein the subset of the all available training data also being selected based on the second inference model.

7. The method of claim 6, wherein the subset of the all available training data comprises a set of features that prevents perfect prediction of labels of the training data by the first inference model.

8. The method of claim 6, wherein the second inference model is a self-supervised learning inference model, and the first inference model being a supervised learning inference model.

9. A non-transitory machine-readable medium having instructions stored therein, which when executed by a processor, cause the processor to perform operations for managing operation of a data pipeline, the operations comprising:

obtaining data comprising a populated field and an unpopulated field, the unpopulated field lacking information due to limitations on information collection;

making a determination regarding whether a first inference model can predict at least the unpopulated field within a reliability range, the reliability range ensuring that inferences generated by the first inference model comply with the limitations;

in an instance of the determination in which the first inference model can predict the at least the unpopulated field:

generating an inference using the first inference model;

populating the unpopulated field using the inference to obtain supplemented data; and providing the supplemented data to a downstream consumer, wherein the operations further comprise, prior to obtaining the data:

using a second inference model to qualify which fields of the data are predictable using other fields of the data; and performing a training process based on the fields of the data that are predictable to obtain the first inference model, wherein the first inference model is trained based on qualified training data comprising a subset of all available training data, the subset being selected based on the reliability range.

10. The non-transitory machine-readable medium of claim 9, wherein the fields are qualified such that the other fields of the data are predictable by at least a minimum level of accuracy but less than a maximum level of accuracy.

11. The non-transitory machine-readable medium of claim 9, wherein the operations further comprise:

obtaining second data comprising the populated field and a second populated field, the second populated field comprising information due to second limitations on the information collection, and content of the second populated field being barred by the second limitations.

12. The non-transitory machine-readable medium of claim 11, wherein the data regarding a first user, and the second data regarding a second user.

13. A data processing system, comprising:

a processor; and a memory coupled to the processor to store instructions, which when executed by the processor, cause the processor to perform operations for managing operation of a data pipeline, the operations comprising:

obtaining data comprising a populated field and an unpopulated field, the unpopulated field lacking information due to limitations on information collection;

making a determination regarding whether a first inference model can predict at least the unpopulated field within a reliability range, the reliability range ensuring that inferences generated by the first inference model comply with the limitations;

in an instance of the determination in which the first inference model can predict the at least the unpopulated field:

generating an inference using the first inference model;

populating the unpopulated field using the inference to obtain supplemented data; and providing the supplemented data to a downstream consumer, wherein the operations further comprise, prior to obtaining the data:

using a second inference model to qualify which fields of the data are predictable using other fields of the data; and performing a training process based on the fields of the data that are predictable to obtain the first inference model, wherein the first inference model is trained based on qualified training data comprising a subset of all available training data, the subset being selected based on the reliability range.

14. The data processing system of claim 13, wherein the fields are qualified such that the other fields of the data are predictable by at least a minimum level of accuracy but less than a maximum level of accuracy.

15. The data processing system of claim 13, wherein the operations further comprise:

obtaining second data comprising the populated field and a second populated field, the second populated field comprising information due to second limitations on the information collection, and content of the second populated field being barred by the second limitations.

16. The data processing system of claim 15, wherein the data regarding a first user, and the second data regarding a second user.

17. The data processing system of claim 13, wherein making the determination comprises:

identifying a type of the unpopulated field; and identifying that the type of the unpopulated field is one of a type of field for which the inferences are generated by the first inference model.

18. The data processing system of claim 17, wherein the subset of the all available training data also being selected based on the second inference model.

19. The data processing system of claim 18, wherein the subset of the all available training data comprises a set of features that prevents perfect prediction of labels of the training data by the first inference model.

20. The data processing system of claim 18, wherein the second inference model is a self-supervised learning inference model, and the first inference model being a supervised learning inference model.

* * * * *